United States Patent [19]

Tanaka

[11] Patent Number: 4,909,366

[45] Date of Patent: Mar. 20, 1990

[54] ONE-WAY CLUTCH

[75] Inventor: Kouichi Tanaka, Nagoya, Japan

[73] Assignee: Kabushiki Kaisha Chubu Bearing Seisakusha, Aichi, Japan

[21] Appl. No.: 211,915

[22] Filed: Jun. 27, 1988

Related U.S. Application Data

[63] Continuation of Ser. No. 5,857, Jan. 21, 1987, abandoned.

[30] Foreign Application Priority Data

Jan. 31, 1986 [JP] Japan .................. 61-017858

[51] Int. Cl.⁴ .............................................. F16D 41/06
[52] U.S. Cl. ....................................... 192/45; 188/82.84
[58] Field of Search .......................... 192/45, 45.2; 188/82.84

[56] References Cited

U.S. PATENT DOCUMENTS

| | | | |
|---|---|---|---|
| 1,927,060 | 9/1933 | Ballard | 192/45 |
| 2,843,238 | 7/1958 | Rozner | 192/45 |
| 3,174,598 | 3/1965 | Mattson | 192/45 |
| 3,339,687 | 9/1967 | Cowles | 192/45 |
| 3,750,593 | 8/1973 | Zetterlund | 104/172.2 |
| 3,885,544 | 5/1975 | Pfeiffer | 123/179 SE |
| 3,990,555 | 11/1976 | Carullo | 192/45 |
| 4,236,619 | 12/1980 | Kuroda | 192/45 |
| 4,585,104 | 4/1986 | Komatsu | 192/107 M |
| 4,591,036 | 5/1986 | Shiga | 192/45 |
| 4,660,698 | 4/1987 | Miura | 192/45 |

FOREIGN PATENT DOCUMENTS

| | | |
|---|---|---|
| 1450161 | 4/1970 | Fed. Rep. of Germany . |
| 1204030 | 1/1960 | France . |
| 1287491 | 2/1962 | France . |
| 2089973 | 1/1972 | France . |
| 2091149 | 1/1972 | France . |
| 2151767 | 4/1973 | France . |
| 2305640 | 10/1976 | France . |
| 2552495 | 3/1985 | France . |
| 2117066 | 10/1983 | United Kingdom . |
| 2130312 | 5/1984 | United Kingdom . |

Primary Examiner—Leslie A. Braun
Assistant Examiner—David A. Testardi
Attorney, Agent, or Firm—Lowe, Price, Leblanc, Becker & Shur

[57] ABSTRACT

A one-way clutch comprises a shaft and an outer race therearound. Plural rollers are circumferentially arranged around the shaft in contact therewith. A torque transmission control ring is interposed between the outer ring and the shaft. The control ring is locked with the outer race and includes grip roller locking spaces each having a shallower part and a deeper part in which spaces the rollers are respectfully received. In one directional rotation of the shaft, the rollers enter into gripping contact between the shaft and control ring to transmit torque and, in the opposite directional rotation, the rollers move out of gripping contact into an idling position. In the idling position, a surface of each control ring space contacts the associated roller to enable the roller to enter into gripping contact between the shaft and control ring substantially immediately upon rotation of the one-way clutch in a direction reverse from the idling direction.

10 Claims, 3 Drawing Sheets

ONE-WAY CLUTCH

This application is a continuation, of application Ser. No. 005,857, filed Jan. 21, 1987 now abandoned.

BACKGROUND OF THE INVENTION

The present invention relates to a one-way clutch mounted on a rotatable shaft for use in a packing machine or an office machine such as a copying machine, a facsimile, a printer and a typewriter.

In general, a bearing-type one-way clutch is composed of an outer race, an inner race and sprags interposed therebetween to function to transmit torque to produce the rotation of the outer or inner race in one direction and to allow the inner or outer race to idle in the other direction.

In the prior art technique, a plurality of sprags $d$ serving as torque transmitting members are retained in a retainer $c$ between the outer race $a$ and the inner race $b$ as shown in FIG. 3a. Said sprags are oriented at such an angle that opposite ends $d_1$ of each sprag maintain sliding contact with the outer race $a$ and the inner race $b$ when inclined clockwise and that the ends come into locking engagement with the outer race $a$ and the inner race $b$ when inclined counter-clockwise. Further, each said sprag $d$ is normally urged toward a position to allow the same to incline counter-clockwise by means of a spring $e$.

In this structure, each sprag is inclined counter-clockwise against the spring $e$ when the outer race or inner race is rotated in a direction as shown by P or P' (FIG. 3a). In this state, the outer race and inner race have no locking engagement with each other such that an idling position is taken. When the outer or inner race is rotated in a direction as shown by q or q', each sprag $d$ is jammed or gripped between the outer and inner race to establish a locking engagement therewith for the transmission of torque (FIG. 3b).

However, in the above-mentioned structure, the retainer is provided independently of the outer or inner race. Further, the springs as part of torque transmitting means are incorporated into the retainer, making the structure complicated for assembly. Furthermore, the operation varies depending on the state of the spring. In an idling state, the resiliency of the springs is applied to the outer or inner race through the sprags so that the rotation of the outer or inner race becomes dull.

Still further, the prior art one-way clutch has a serious drawback that there is a backlash when the operation is to be shifted from idling to clutching since retainers $c$ are not rigidly provided between the outer race $a$ and the inner race $b$.

SUMMARY OF THE INVENTION

In view of the above-mentioned disadvantages the object of the present invention is to provide a one-way clutch without using such a spring member.

According to the present invention, there is provided a one-way clutch comprising a shaft; outer race means surrounding said shaft; a plurality of rollers circumferentially arranged around said shaft in contact with said shaft; a torque transmission control means interposed between said outer race and said plurality of rollers, said outer race means being locked with said torque transmission control ring, said torque transmission control ring and said shaft forming grip-roller locking spaces each having a shallower part and a deeper part, said grip roller locking spaces being arranged to converge in a predetermined direction; and retainer means for retaining said rollers in said respective grip-roller locking spaces, said retainer means having support faces on a deeper part side of the respective rollers in an immediate neighborhood thereof.

PREFERRED EMBODIMENT OF THE PRESENT INVENTION

Figure 1:
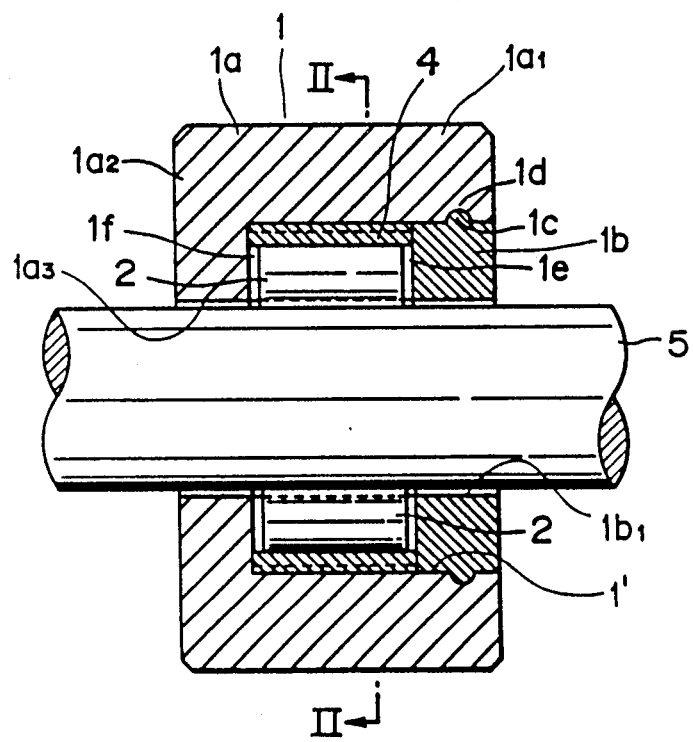
FIG. 1 is a vertical sectional view showing one embodiment of the present invention.
Figure 2:
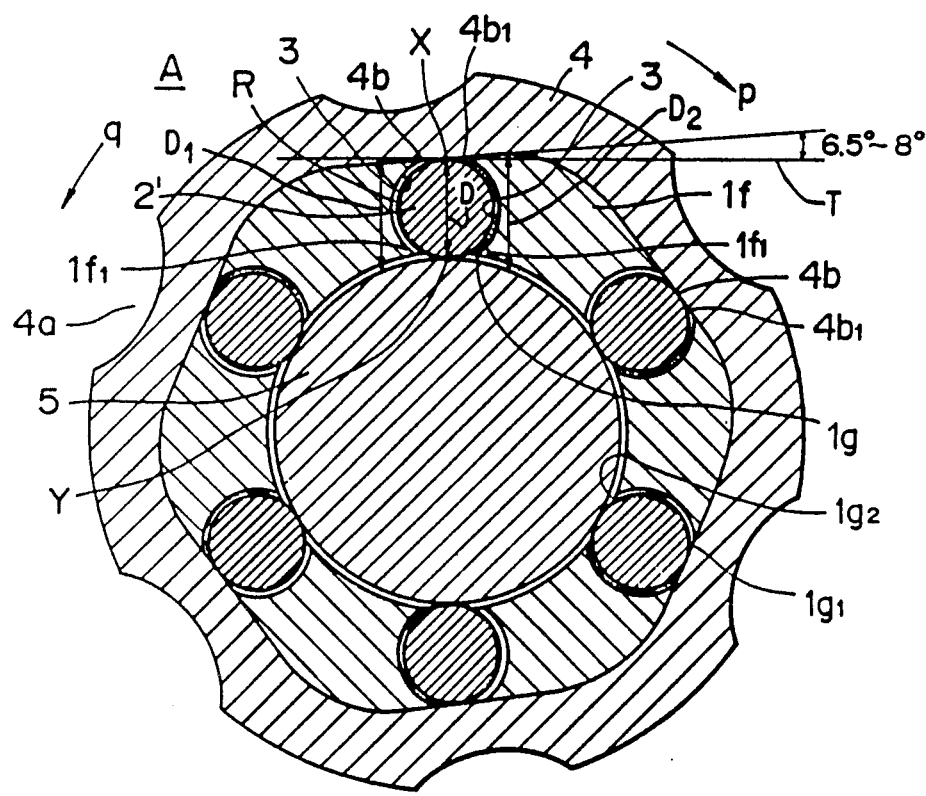
FIG. 2 is a sectional view taken along line II—II of FIG. 1.
Figure 3A:
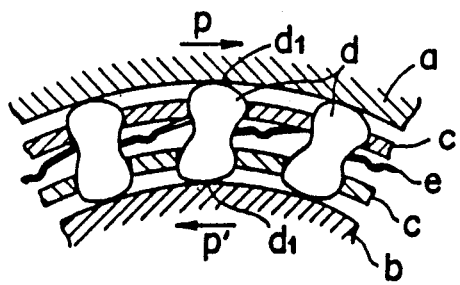
FIGS. 3a and 3b are views explaining the prior art.
Figure 3B:
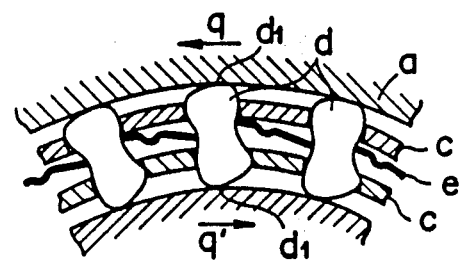

One embodiment of the present invention will be described in conjunction with FIGS. 1 and 2. In the drawings, reference numeral 1 represents a main ring of synthesized resin as an outer race member. Main ring 1 is composed of a generally cup-shaped member 1a and an annular cover member 1b. Member 1a has a cylindrical wall section $1a_1$ and a floor wall section $1a_2$ to define a recess 1' therein. Member 1a is centrally formed therein with a circular aperture $1a_3$ annular cover member 1b is received in recess 1' at an inlet portion thereof and snap-fitted into the cylindrical wall section $1a_1$ through projection 1c and recess 1d engagement. Annular cover member 1b has a circular aperture $1b_1$ centrally formed therein to provide axial alignment with opening $1a_3$ in the floor wall section $1a_2$ to permit insertion of a shaft 5 therethrough.

Annular cover member 1b has a plurality of projections to form partition walls $1f$ radially arranged. Said partition walls $1f$ extend integrally from the annular cover member 1b at radially inner portion thereof into said recess 1' to reach the floor wall section $1a_2$ of the cup-shaped member 1a such that a torque transmission control ring 4 of sintered metal is supported between said partition walls $1f$ and the cylindrical wall section $1a_1$ of the cup-shaped member 1a. The inner surface of the torque transmission control ring 4 is substantially of hexagonal shape whereas the outer surfaces of the partition walls $1f$ cooperate to form a complementary shape for engagement with the ring 4. As a result, said partition walls $1f$ are provided rigidly relative to the torque transmission control ring 4. Further, respective two adjacent partition walls $1f$ are formed with concave surfaces 3 to oppose steel rollers 2 from both sides thereof. Each steel roller 2 is prevented from escaping from between the opposing two concave surfaces by means of two pairs of opposing projections $1f_1$. Said two pairs of projections $1f_1$ define radially outer and inner gaps $1g_1$ and $1g_2$. Said torque transmission control ring 4 and shaft 5 oppose the rollers 2 from radially outside and inside to contact the same substantially at opposite radial ends thereof with respect to the shaft 5 such that a plurality of wedge-shaped accommodation chambers R are defined by the torque transmission ring 4 and the shaft 5.

The torque transmission control ring 4 is divided into six circumferential sections. At the outer periphery, six recesses 4a are formed to engage with the projections (not shown) of the main ring 1. At the inner periphery thereof, there are formed flat inner surfaces 4b each extending at an angle of 6.5°–8° relative to the tangential line T of the corresponding roller having diameter D, said tangential line intersecting a line connecting centers of said corresponding roller 2 and said shaft 5 at a right angle. Therefore, the flat inner surfaces 4b offers the structure of said accommodation chambers R in the form of grip-roller locking mechanisms, wherein the accommodation chambers R are in principle grip-roller locking spaces each having a shallower part and a deeper part $D_2^1$, wherein $D_2 > D_1$, and $D_2 > D > D_1$ such that said grip-roller locking spaces are arranged to converge in a predetermined direction. Each steel roller 2 has a diameter of 1.0 to 2.5 mm.

In the present invention, it is essential that the concave surfaces of partition walls 1f on the deeper part side $D_2$ stand in the immediate neighborhood of the rollers 2 when all of said rollers are jammed in the shallower part $D_1$ of the grip-roller locking spaces whereas said rollers 2 are retained by said concave surfaces 3 when released from the shallower part for declutching; in prefeferred embodiments, the distance between each roller 2 and each concave surface 3 on the deeper part side thereof may be between 0.01 to 0.03 mm.

In this case, when the shaft 5 is rotated in a direction shown by P, each steel roller 2 is moved through a small distance of 0.01 to 0.03 mm, that is, from the shallower part to the deeper part to come into abutment with the supporting concave surface 3 of the partition wall 1f, so that the steel roller 2' is loosley fitted in the deeper part $D_2$. On the other hand, the shaft 5 is rotated in a reverse direction shown by q, the steel rollers 2 are moved through the small distance to the direction away from the supporting concave surfaces 3 so that all the steel rollers 2 are instantaneously jammed into the shallower parts of the wedge-shaped accommodation chambers R to transmit torque to the outer race member 1.

This small distance movement of the rollers 2 at the time of clutching operation minimizes the backlash of the one-way clutch.

The invention has the following effects; each of the rollers supported in the small accommodation chambers may be jammed in the shallower parts of the accommodation chambers to lock the main ring and shaft together upon rotation of the main ring or the shaft to transmit torque. Since the gaps between the rollers and the partition walls on the deeper side thereof are minimum and without any spring members, the whole structure of the one-way clutch is simplified, thus effecting easy manufacture of the same. Further, the one-way clutch according to the present invention may keep stable operation and smooth idling operation as well as minimizing the backlash often observed at the starts of torque transmission.

What is claimed is:
1. A one-way clutch comprising
a shaft;
outer race means surrounding said shaft;
a plurality of rollers circumferentially arranged around said shaft in contact therewith; and
a torque transmission control means including a torque transmission control ring interposed between said outer race means and said plurality of rollers, said outer race means being locked with said torque transmission control ring and non-rotatable with respect thereto, said torque transmission control ring and said shaft defining grip-roller locking spaces each having a shallower part and a deeper part, said grip-roller locking spaces being arranged to converge in a predetermined direction, said torque transmission control means including retainer means provided in substantially rigid contact with said torque transmission control ring for retaining said rollers in said respective grip-roller locking spaces; said retainer means having support faces respectively adjacent a deeper part facing side and a shallower part facing side of the respective rollers, wherein said retainer means retains said rollers in their respective grip-roller locking spaces without spring bias, wherein the support face on the deeper part facing side is formed immediately adjacent the associated roller such that said roller enters into gripping contact between the shaft and the control ring substantially immediately upon rotation of the one-way clutch in a direction reverse from an idling direction out of contact with the support face on the deeper part facing side.

2. A one-way clutch according to claim 1, wherein said torque transmission control ring includes a plurality of flat inner surfaces in contact with the respective rollers, each flat inner surface being inclined relative to a tangential line of a corresponding roller at a predetermined angle, said tangential line intersecting a line connecting centers of said roller and said shaft at a right angle.

3. A one-way clutch according to claim 2, wherein said predetermined angle ranges from 6.5° to 8°.

4. A one-way clutch according to claim 1, werein said retainer means and said shaft are in a loose-fit relationship with each other.

5. A one-way clutch according to claim 1, wherein said rollers are comprised of steel.

6. A one-way clutch according to claim 1, wherein said torque transmission control ring is comprised of sintered metal.

7. The clutch of claim 1, wherein said rollers are retained in their respective locking spaces without spring bias when in the deeper part corresponding to the idling position of said clutch.

8. The clutch of claim 1, wherein said retainer means include concave surfaces defining said support faces, substantially each concave surface extending substantially continuously between inner and outer circumferential surfaces of the retainer means.

9. The clutch of claim 1, wherein said shallower part is the straight line distance $D_1$ between an inner surface of the control ring and an outer surface of the shaft and wherein said deeper part is defined by the straight line distance $D_2$ between the inner surface of the control ring on an opposite side of the associated locking space and an outer surface of said shaft, wherein $D_2 > D_1$.

10. The one-way clutch of claim 1, wherein said support face on the deeper part facing side is formed immediately adjacent the associated roller such that said roller enters into gripping contact between the shaft and the control ring substantially immediately upon rotation of the one-way clutch in the direction reverse from the idling direction is spaced from the associated roller a distance less than about 0.03 mm when the roller is in the gripping contact position.

* * * * *